United States Patent [19]

Teranishi

[11] Patent Number: 4,622,142
[45] Date of Patent: Nov. 11, 1986

[54] FILTER DEVICE

[75] Inventor: Masahiro Teranishi, Aichi, Japan

[73] Assignee: Kabushika Kaisha Toshiba, Kawasaki, Japan

[21] Appl. No.: 759,343

[22] Filed: Jul. 26, 1985

[30] Foreign Application Priority Data

Aug. 16, 1984 [JP] Japan .................................. 59-170876
Sep. 28, 1984 [JP] Japan .................................. 59-204214
Oct. 30, 1984 [JP] Japan .................................. 59-228478

[51] Int. Cl.$^4$ ...................... B01D 25/04; B01D 35/00
[52] U.S. Cl. .................................. 210/238; 210/380.2; 210/450; 210/451; 210/453; 210/455
[58] Field of Search ...................... 210/348, 380.2, 435, 210/450, 451, 453, 455, 470, 483, 496, 497.01, 238, 493.3

[56] References Cited

U.S. PATENT DOCUMENTS 2,413,954  1/1947  Conterman .......................... 210/451

FOREIGN PATENT DOCUMENTS 57-173806  11/1982  Japan .
58-3912  1/1983  Japan .

Primary Examiner—Frank Sever
Attorney, Agent, or Firm—Cushman, Darby and Cushman

[57] ABSTRACT

A device filters impurities such as iron oxides contained in a water supply. The device includes a container having an open top end, a filter assembly housed in the container and a lid member closed over the open top end of the container. The container is partitioned into an intake chamber, a discharge chamber and an overflow passage. The lid member includes an adjusting member in contact with the filter assembly to adjust and maintain the filter assembly at a correct position within the container. The filter assembly also includes a handle member to enable a user to remove and reinsert the filter assembly from and into the container, respectively.

20 Claims, 7 Drawing Figures

FILTER DEVICE

BACKGROUND OF THE INVENTION

1. Field of the Invention

The present invention relates to filter devices, and in particular, to filter devices for filtering foreign substances e.g. iron oxides which may be contained in water supplied to an apparatus, such as a washing machine.

2. Description of the Prior Art

It has recently been proposed to provide a washing machine with separate washing and dehydrating tubs for respective washing of fabric articles on the one hand and for rinsing and dehydrating the fabric articles on the other hand. When using washing machines of this type in geographical areas where the water supply is contaminated or contains impurities, the washed articles may become discolored by iron oxide powder or other foreign matter contained in the water supply when the contaminated water is supplied to the dehydrating tub for rinsing the washed fabric articles. Therefore, washing machines intended for use in those geographic areas where the water supply is impure must be provided with a filter for filtering the water supplied to the dehydrating tub. Normally, the water filters are provided structurally independently of the washing machine.

Conventional water filters include a housing formed with a cylindrical hollow body opened at its top end and a lid member as can be seen by reference to published Japan Patent Application No. 57-173806. The lid member closes the open top end of the cylindrical hollow body in a water tight manner. A cylindrical hollow filter medium is then concentrically disposed in a loose-fitting relationship within the cylindrical hollow body. The cylindrical hollow filter medium partitions the interior of the cylindrical hollow body into substantially concentrically oriented discharge and intake chambers. Water from the water supply is thus introduced into the intake chamber, and then forcibly discharged into the discharge chamber through the cylindrical hollow filter medium by means of the water supply pressure.

In the above construction (typically referred to as a closed-type filter), the housing of the filter is made of steel so that it can better withstand the pressure of the water supply. Therefore, such filters are relatively more expensive owing to their steel construction. Moreover, the lid member of the conventional filter is not easily openable except with the use of special tools when a user intends to clean the cylindrical hollow filter medium contained therein.

SUMMARY OF THE INVENTION

The present invention however, provides a filter device which removes impurities, such as iron oxide powder, from water and is structurally protected from the pressure of the water supply. In such a manner, the filter device of this invention can be constructed of relatively light-weight materials.

The filter device of this invention utilizes an improved container construction of the so-called open-air type which is open at its top end. The container houses a filter assembly therein and is provided with an overflow port through which excess water fed from the water supply is discharged from the container. The filter assembly includes a handle member to enable a user to more easily remove the filter assembly from and reinsert the filter assembly into the container, respectively. A removable lid member closing the top of the container is also provided. The lid member includes an adjusting member to maintain the filter assembly at a prescribed position within the container when the lid member is in its closed state. The adjusting member biases the filter assembly toward its prescribed position and is maintained in contact with the filter assembly when the filter assembly is at its prescribed position in the container.

The filter assembly also includes a supporting member formed with a base plate and side wall plates extending from both ends of the base plate at right angles, respectively. The side wall plates hold the filter medium therebetween. A space is defined between the bottom surface of the base plate and the bottom surface of the container when the filter assembly is housed in the container so that the base plate of the supporting member is capable of movement into the space so as to accommodate extension of the filter medium which may occur during use.

BRIEF DESCRIPTION OF THE ACCOMPANYING DRAWINGS

The invention will be better understood by reference to the accompanying drawings, wherein like numerals throughout the various Figures denote like structural elements and wherein.

DETAILED DESCRIPTION OF THE PREFERRED EXEMPLARY EMBODIMENTS

Preferred embodiments of the present invention will now be described in more detail with reference to the accompanying drawings.

Figure 1:
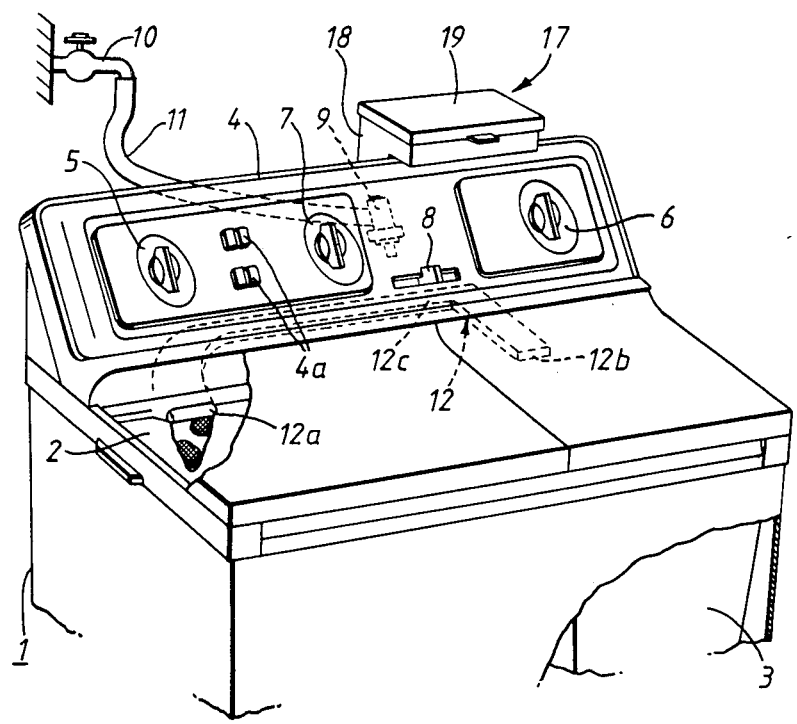
FIG. 1 is a perspective view, partly in section, of the upper portion of a washing machine using the filter device of this invention.

An overall assembly of a washing machine utilizing the present filter device of the invention is shown in accompanying FIG. 1. An outer cabinet 1 of the washing machine houses a washing tub 2 and a separate water-receiving tub 3 in which a spin tub (not shown) is rotatably supported. An operation control console 4 extends upwardly from the top of the cabinet 1 at the rear portion of the washing machine. As is conventional, the front surface of console 4 includes manually-operable operating knobs 4a, a washing timer 5, a spin timer 6, and a water level selection knob 7. A water supply change-over lever 8 is also provided on the slanted front face of the console 4. A water supply control device 9 (shown in broken line in FIG. 1) is housed in the console 4 and is connected to the water supply tap 10 through a hose 11 or like conduit means.

The water supply control device 9 is a conventional water controller which regulates the water flow rate by means of a valving device (not shown) housed therein.

A water duct 12 is provided within cabinet 1 such that one end 12a thereof opens into the washing tub 2 while the other end 12b thereof opens into the spin tub 3. A partition wall 12c adjacent to the water supply change-over lever 8 is provided in the duct 12 so as to partition the duct 12 into separate supply paths to the tubs 2 and 3.

Figure 2:
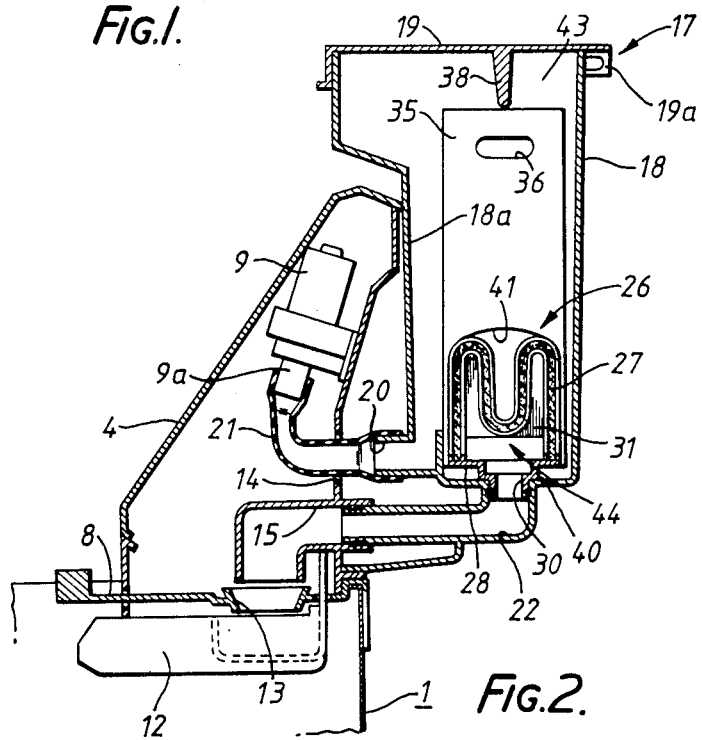
FIGS. 2 and 3 are vertical side sectional views of the filter device of this invention used with the washing machine of FIG. 1.

As is more clearly seen in FIG. 2, the water supply change over lever 8 is provided with a water guide tube 13, which is preferably downwardly tapered. When the water supply change-over lever 8 is moved toward the washing tub 2 (i.e., towards the left as viewed in FIG. 1) or towards the spin tub 3 (i.e., towards the right as viewed in FIG. 1), the bottom end of the water guide tube 13 is thereby responsively positioned on the left or right sides, respectively, of the partition wall 12c (FIG. 1). Thus, the direction in which the supply water is fed via duct 12 is selectively changed either to the washing tub 2 or the spin tub 3. A filter device 17 of this invention is fixed to the rear of the operation control console 4 by means of screws or other like securing elements.

A water intake opening 14 is formed on the back of the console 4 as is also shown in FIG. 2. A tubular intake port 15, (one end of which projects rearwardly) is formed at the back of the operation control console 4. The other end of the tubular intake port 15 extends into the operation control console 4 and is downwardly bent so that it is capable of being registered with the water guide tube 13 when the latter is moved therebeneath upon manipulation of lever 8. The intake port 15 thus selectively communicates with either the washing tub 2 or the spin tub 3, through manipulation of the water guide tube 13 via lever 8.

Figure 3:
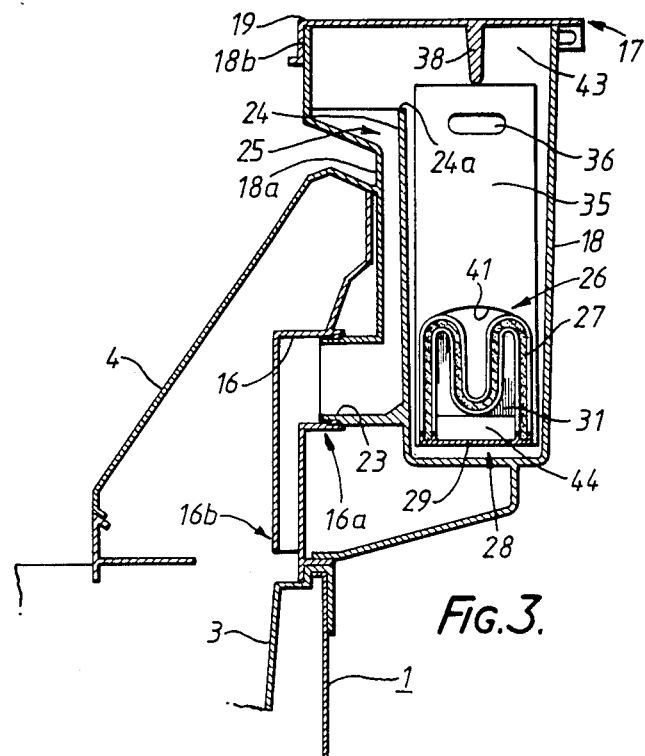

A tubular auxiliary intake port 16 is formed at the rear of the operation control console 4 as is more clearly seen by reference to FIG. 3. One end 16a of port 16 projects rearwardly while the other end 16b of the tubular auxiliary intake port 16 extends into the operation control console 4 and is bent downwardly so that it opens into the spin tub 3.

A tubular water inlet port 20 is internally formed at the front of the container 18, such that it forwardly projects from the front of container 18 as shown in FIG. 2. The water inlet port 20 and the water discharge port 9a of the water supply control device 9 are connected to one another by means of a hose 21 inserted through the water intake opening 14 of console 4. Water outlet port 22 is integrally formed in the bottom of the container 18 such that it projects forwardly from the container 18 with the front end thereof being connected to the tubular intake port 15. The water outlet port 22 preferably forwardly extends parallel to the water inlet port 20.

As can be seen more clearly by reference to FIG. 3, a tubular overflow port 23 forwardly projects from the front wall or side surface 18a of the container 18. The overflow port 23 includes a partition wall 24 disposed substantially parallel to the front wall 18a of the container 18 and is upwardly projected from the bottom of the container 18. The partition wall 24 and the front wall 18a of the container 18 together define an overflow passage 25 formed so as to extend vertically within the front part of the container 18 such that the upper portion of the overflow passage 25 is in fluid communication with and opens upwardly within the upper interior portion 18b of container 18. The overflow port 23 is connected to the tubular auxiliary intake port 16 and thus is also in communication with the ambient air.

Figure 4:
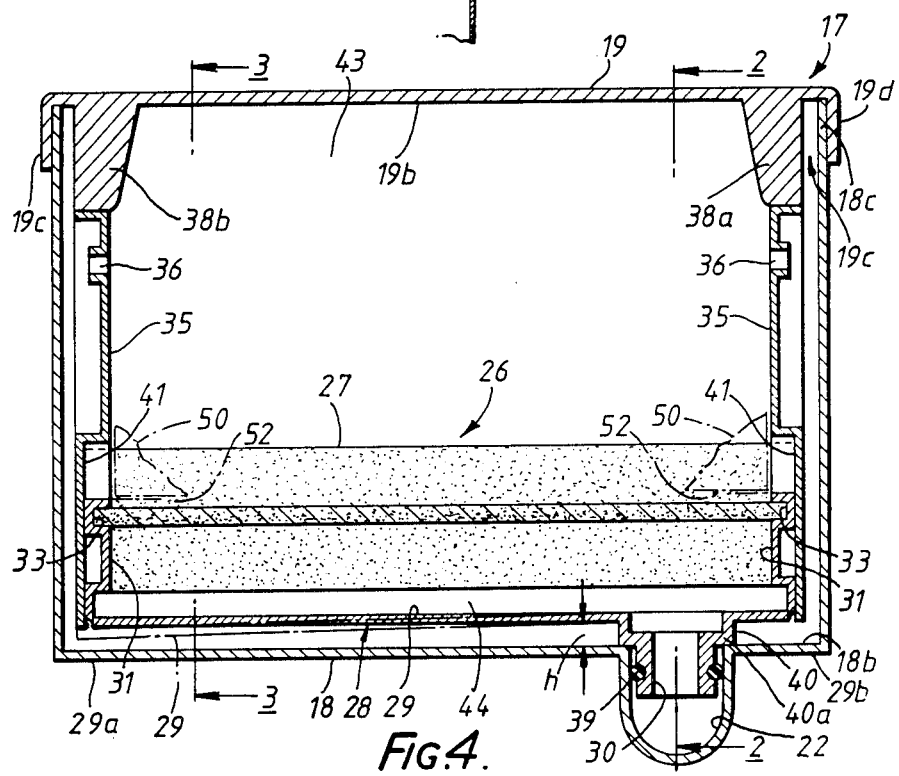
FIG. 4 is a vertical front sectional view of a filter device in accordance with one embodiment of the present invention.
Figure 5:
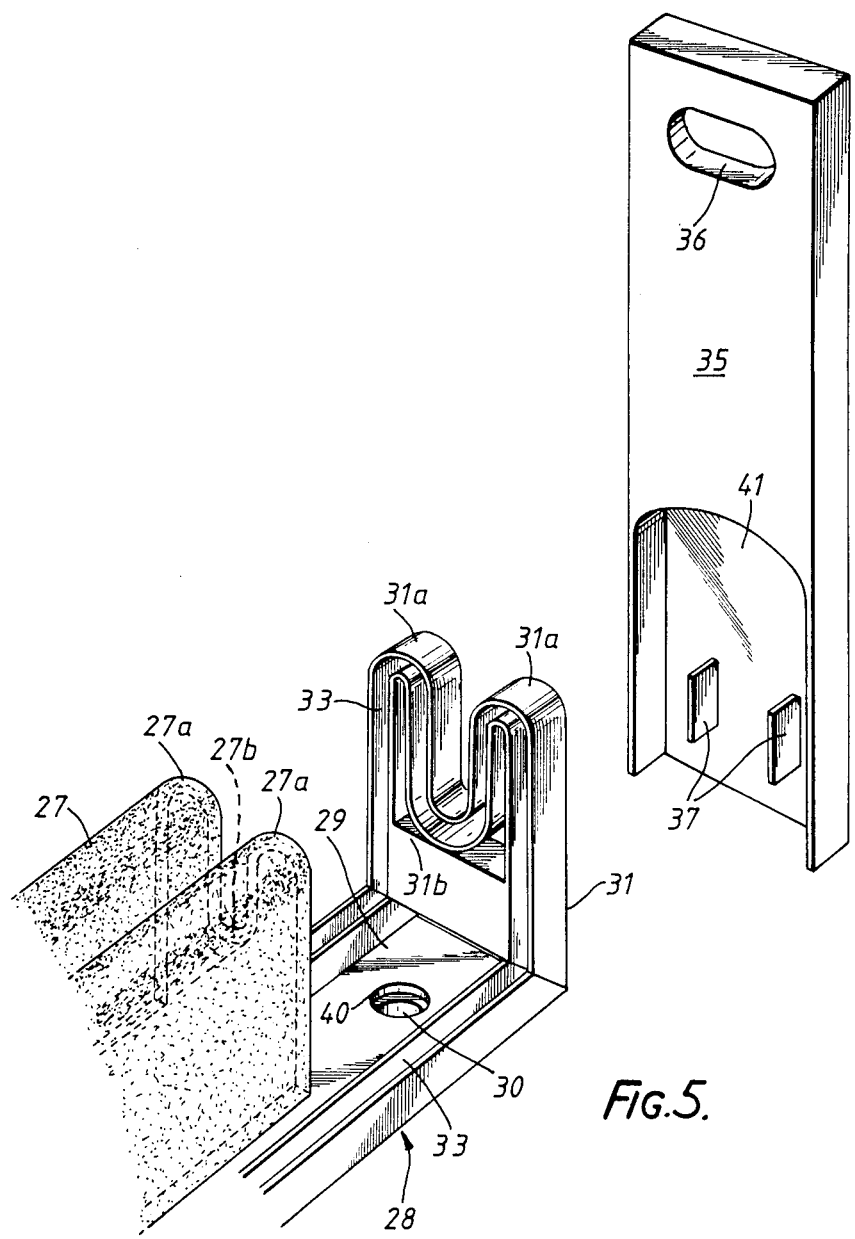
FIG. 5 is an exploded perspective view of the representative component structural details of the filter assembly of this invention.
Figure 6:
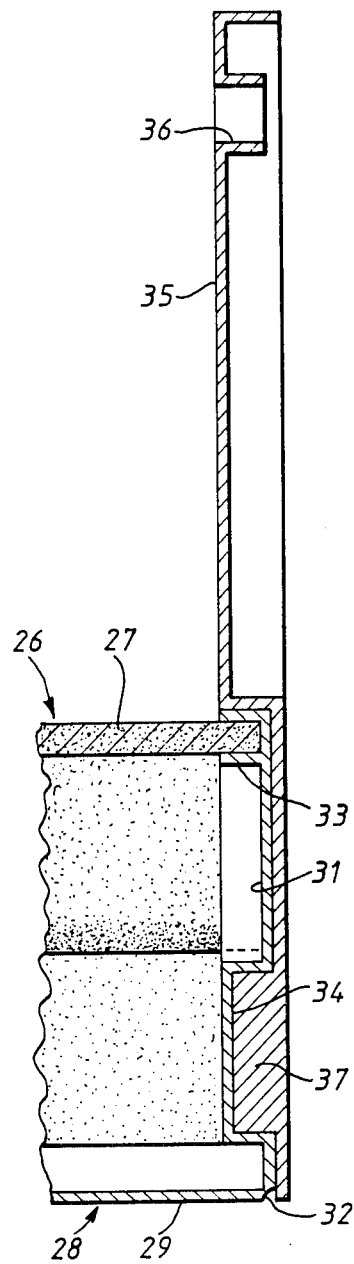
FIG. 6 is a front vertical sectional view of a representative portion of the filter assembly of this invention.

A description of the filter device 17 follows with particular attention being directed to FIGS. 4–6. The container 18 of the filter device 17 is open at its top end 18c and includes a lid member 19 pivotally mounted to the top end 18c of container 18 by means of hinge assembly 19a (FIG. 2). The lid member 19 is thus capable of opening and closing the top end 18c of the container 18. The lid member 19 also includes an opposing pair of lateral adjusting members 38 (FIG. 3) each projecting downwardly from top surface 19b of the lid member 19 as is shown in FIG. 4. Adjusting members 38 are disposed so as to be substantially parallel to the elongated axis of filter medium 27 and, moreover, establish a space 19c together with the respective side surfaces 19d of lid member 19 for accomodating the top end 18c of container 18.

A filter assembly 26 is removably housed within the container 18. The filter assembly 26 includes a filter medium 27 which is corrugated in form such that it establishes a pair of convexly-curved peaks 27a (FIG. 5) separated by a concavely-curved valley 27b as is more clearly seen in FIG. 5. As is conventional, the filter medium 27 is formed of porous material having a large number of fine water-premeable holes.

The filter medium 27 is supported by a supporting member 28 in the container 18. The supporting member 28 includes a base plate 29 extending along the elongated direction of the filter medium 27. The base plate 29 defines a tubular discharge port 30 projecting downwardly from the bottom thereof. The supporting member 28 also includes a pair of side wall plates 31 mounted upright on respective sides of the base plate 29. Base plate 29 and the side wall plates 31 are connected to one another by means of respective integral hinges 32 as shown in FIG. 6 to permit the side wall plates 31 to be easily pivotally movable towards and away from one another.

The side wall plates 31 are formed in the same corrugated shape as that of the filter medium 27 such that it establishes a pair of peaks 31a and a valley 31b. A groove 33 is formed on the interiorly-facing surfaces of supporting member 28 thereby forming a border on the entire periphery of supporting member 28. The filter medium 27 is attached to the supporting member 28 by inserting the peripheral edges of the filter medium 27 into the groove 33 of the supporting member 28 and securing it with adhesive, for example, in such a manner as to close the otherwise open bottom and sides of the filter medium 27.

The outer surface of the side wall plates 31 define individual recessed portions 34. When filter medium 27 is properly positioned within container 18, an intake chamber 43 and discharge chamber 44 is established therein. See FIG. 2. A pair of handle members 35 is provided each of which includes holes 36 at one end for permitting ease of handling and, at the other end thereof, a recessed portion 41 having a pair of projections 37 (FIG. 5). Each handle member 35 is thus detachably coupled to a respective side wall plate 31 by means of the pair of projections 37 being inserted into respective recessed portions 41 of the side wall plate 31 as is shown in FIG. 6 such that recessed portions 41 bound the respective side wall plates 31.

As can be seen in FIG. 4 the tubular discharge port 30 includes a sealing ring 39 constructed of rubber or like material, positioned around the outer surface thereof. A tubular boss member 40 is provided between the upper end of the tubular discharge port 30 and the base plate 29 of the supporting member 28. The tubular boss member 40 is formed such that it projects from the base plate 29 at a prescribed height "h" with its outer diameter being larger than the diameter of the tubular discharge port 30. When the filter assembly 26 is disposed in its correct position within the container 18, the discharge port 30 is inserted into and thus is in fluid communication with the water outlet port 22 of the container 18. The base plate 29 of the supporting member 28 is held at the predetermined distance "h" from the bottom surface 18b of the container 18 by virtue of the tubular boss member 40 being in contact with the bottom surface 18b. Moreover, the adjusting members 38a, 38b of the lid member 19 superiorly register with the top portion of a respective one of the handle members 35 of the supporting member 28 so as to ensure that the filter assembly 26 is maintained in its correct position when the lid member 19 is closed. Thus, the bearing contact between each adjusting members 38a, 38b on the one hand and a respective handle member 35 forcibly maintains the filter assembly 26 in its correct position within container 18 so as to prevent tilting of filter assembly 26 therein.

When washing or rinsing operations are performed, the water feed change over lever 8 of FIG. 2 is positioned according to the desired operation and the water supply tap 10 of FIG. 1 is turned on. When either the washing timer knob 5 or the spin timer knob 6 is operated, the water supply control device 9 is automatically opened as is conventional. The tap water is then fed from the water supply and flows into the intake chamber 43 of container 18 through the water inlet port 20. The water in chamber 43 then flows through filter medium 27 thereby filtering out impurities and enters discharge chamber 44 whereupon the filtered water flows through discharge port 30 and then on to the appropriate tub 2 or 3 depending upon the position of guide tube 13.

As previously mentioned, water is fed into the intake chamber 43 via inlet port 20. The supplied water accumulates in the intake chamber 43 until its pressure head causes it to be forcibly passed through the filter medium 27 thereby removing impurities such as iron oxide powder therefrom. Thus, the filtered water flows into the discharge chamber 44 and then on to the washing tub 2, or the spin tub 3 through the discharge port 30 via the water outlet port 22, the intake port 15 and the water guide tube 13, respectively. Thus, the container 18 of the present invention need not withstand the pressure of the water supply but rather needs only to withstand the relatively low pressure hydraulic head of the water accumulated therein. Container 18 may therefore be constructed of synthetic resin or other light-weight materials.

During filtration, the two side wall plates 31 of the supporting member 28 are extended outwardly by the distortion of the filter medium 27 as it is wetted with the water flowing therethrough. The base plate 29 of the supporting member 28 is thus responsively flexed so as to assume a curved configuration in its central portion which thus, in turn, causes downward displacement of that end 29a which is farther removed from discharge port 30 than end 29b. Displacement of base plate 29 therefore occurs as is shown in chain line in FIG. 4. The base plate 29 of the supporting member 28 is supported in such a way that it is held at a predetermined distance "h" from the bottom 18b of the container 18 by the means of boss member 40 provided on the bottom surface of the base plate 29. Thus, both ends 29a, 29b of the base plate 29 are prevented from contacting the bottom of the container 18. Since the collar portion 40a of the boss member 40 is always in contact with the bottom surface 18b of the container 18, loosening of the engagement between the discharge port 30 and the water outlet port 22 thereby prevents leakage of water through this connection.

During extended periods of usage, the filter medium 27 may become so blocked that it will need cleaning. The level of the water accumulated in the container 18 will thus be raised above the top edge 24a of the partition wall 24 since top edge 24a establishes a maximum water level within container 18. The excess water will therefore flow into the overflow passage 25, and then out from the overflow port 23 into the separated water-receiving tub 3 through the auxiliary intake port 16 thereby preventing the overflow of water from container 18 to the exterior environment.

When the filter medium 27 needs to be cleaned, the lid member 19 is opened and the handle members 35 are grasped by the holes 36 so that the filter assembly 26 can be manually lifted from container 18. At the same time, the discharge port 30 of the filter assembly 26 is coupled to or withdrawn from the water outlet port 22 of the container 18 when assembly 26 is removed or reinserted into container 18, respectively. After the filter medium 27 has been cleaned, the handle members 35 are again grasped and the filter assembly 26 is again placed within the container 18 so that the discharge port 30 is inserted into the water outlet port 22.

The user will typically be unable to visually determine whether or not the discharge port 30 and the outlet port 22 are matably coupled since the ports 30 and 22 are hidden by filter medium 27. If, in fact, the filter assembly 26 is in an incorrect position (e.g. a position whereby ports 30 and 22 are not mated with one another), the structure of the present invention functions so as to properly adjust the position of assembly 27 within container 18 simply by closing the lid member 19. When the lid member 19 is pivotally moved into a closing relationship with the top 18a of container 18, their respective handle members 35 will contact each other. Accordingly, should the filter assembly be skewed within container 18, the adjusting members will properly align the filter assembly 26 within container 18 concurrently with the closing movement of lid member 19 by virtue of the contact between adjusting members 38a, 38b and their respective handle member 35. In such a manner the filter assembly 26 will be positioned properly within container 18 to thereby ensure proper mating of ports 30 and 22. If, on the other hand, the filter assembly 26 is so mispositioned within container 18 such that closure of lid member 19 will not effect proper alignment of ports 30 and 22, the adjusting members 38a, 38b will prevent complete closure of lid member 19 by virtue of their contact with handle member 35. In such a situation therefore, the user will be alerted to the need to manually reposition the filter assembly 26 within container 18.

The construction of the filter assembly 26 also prevents the filter medium from separating from the side wall plates 31 of the supporting member 28 when strong external forces are applied to the holding members 35 since the handle members 35 are removably engaged with the side wall plates 31 of the supporting member 28. Furthermore, the construction of the filter assembly 26 permits the handle members 35 to be eliminated from the listed service parts required when the filter medium 27 needs to be replaced since the handle members 35 do not themselves need to be replaced concurrently with the filter medium 27 due to their separability from supporting member 28.

Figure 7:
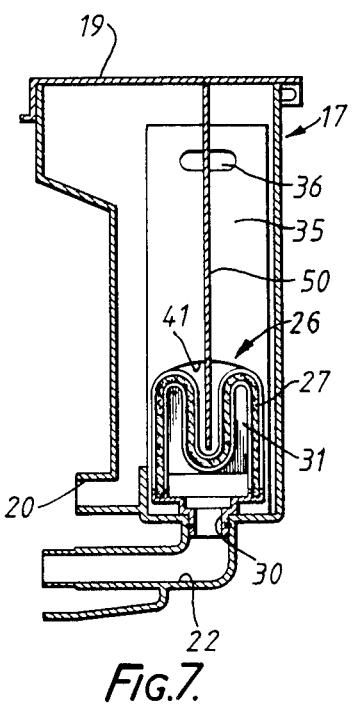
FIG. 7 is a vertical sectional view of a filter device in accordance with another embodiment of the present invention.

FIG. 7 shows another embodiment of the present invention wherein the adjusting member 50 projects downwardly from the lid member 19 and extends to the filter medium 27. The top edge portion 52 (FIG. 4) of the side wall plates 31 in this embodiment projects inwardly away from the handle members 35 as can be seen more clearly by the dashed line representation thereof in FIG. 4. Thus, the adjusting member 50 bears against the top edge portion 52 of the side wall plates 31 of the supporting member ensuring the correct positioning of the filter assembly 28 when the lid member 19 is closed.

In summary, it will be seen that the present invention overcomes the disadvantages of the prior art and provides an improved filter device which is capable of removing foreign substances from water and is not dependent upon the pressure of water supply for its proper functioning. Thus, while the present invention has been disclosed in what is presently conceived to be the most preferred embodiments thereof, those in this art may recognize that many modifications may be made which shall be accorded the broadest scope of the appended claims so as to encompass all equivalent structures and assemblies.

What is claimed is:

1. A filter device comprising: A means designed for preventing discoloration of washed articles by filtering impurities, such as iron oxide powder and other foreign matter contained in a water supply to a washing machine wherein washed articles are rinsed as water is supplied, including,
   a container having an open top end, a bottom surface which includes a water outlet port, a water inlet port defined in the container and an overflow port, said water inlet, outlet and overflow ports being in communication with the ambient air;
   filter assembly means including a filter medium housed in the container for partitioning the interior of the container into an intake chamber for receiving water from the water supply and a discharge chamber for receiving filtered water which has flowed through said filter medium, said intake chamber including the water inlet port and said discharge chamber including the water outlet port;
   means defining an overflow passage extending to a predetermined height above said bottom surface and having an overflow entrance located in the intake chamber to establish a maximum water level in said container, said overflow passage including said overflow port and being in fluid communication with the intake chamber and the ambient air through said overflow port; and
   a lid member for closing the top end of the container.

2. The filter device according to claim 1 wherein said filter assembly includes supporting means for supporting the filter medium.

3. The filter device according to claim 2 wherein said filter medium is formed in a curved shape.

4. The filter device according to claim 3 wherein said supporting means includes a base plate defining a discharge port inserted into the water outlet port of the container, and side wall plates extending at a right angle from ends of the base plate so as to enclose the curved portion of the filter medium.

5. The filter device according to claim 4 wherein each side wall plate includes an integral hinge means for connecting each said side wall plate to the respective ends of the base plate.

6. The filter device according to claim 5 wherein said base plate includes a pair of lateral grooves extending parallel to one another for holding respective lateral edges of the filter medium.

7. The filter device according to claim 6 wherein each side wall plate includes side grooves so as to hold respective side edges of the filter medium.

8. The filter device according to claim 4 wherein said base plate includes a pair of lateral grooves extending parallel to one another for holding respective lateral edges of the filter medium.

9. The filter device according to claim 8 wherein each side wall plate includes side grooves so as to hold respective side edges of the filter medium.

10. The filter device according to claim 4 wherein said filter assembly further includes at least one handle member enabling the filter assembly to be manually removed from and inserted into the container.

11. The filter device according to claim 10 wherein said handle member includes an elongated plate, one end of said plate being detachably connected to side wall plate of said supporting member.

12. The filter device according to claim 11 wherein said lid member includes adjusting means projecting downwardly from said lid member for contacting the top of the other end of the elongated plate of said handle member when said lid member is moved to its closed position for responsively adjusting the positioning of the filter assembly within the container.

13. The filter device according to claim 4 wherein said base plate of the supporting member includes boss means for maintaining said base plate at a predetermined distance from the bottom surface of the container so as to establish a space between said base plate and said bottom surface.

14. The filter device according to claim 13 wherein said boss means includes a tubular boss member which is formed integrally with said discharge port so as to project from the base plate at a dimension corresponding to said predetermined height, wherein the diameter of said boss member is larger than the diameter of the discharge port.

15. The filter device according to the claim 4 wherein said lid member includes adjusting means projecting downwardly from said lid member for contacting at least one of the tops of the side wall plates of said supporting means when said lid member is moved to its closed position for responsively adjusting the positioning of the filter assembly within the container.

16. The filter device according to claim 2 wherein said filter assembly further includes at least one handle member enabling the filter assembly to be manually removed from and inserted into the container.

17. The filter device according to claim 16 wherein said lid member includes adjusting means projecting downwardly from said lid member for contacting the top of the other end of the elongated plate of said handle member when said lid member is moved to its closed position for responsively adjusting the positioning of the filter assembly within the container.

18. The filter device according to the claim 1 wherein said overflow passage includes a partition wall upwardly extending from the bottom surface of the container so as to establish the overflow passage.

19. A filter device comprising: A means designed for preventing discoloration of washed articles by filtering impurities, such as iron oxide powder and other foreign matter, from a water supply including, container means having a bottom wall defining an outlet port and opposing pairs of side walls to thereby establish an open top opposite said bottom wall for containing a predetermined volume of water therein, said container means further having an inlet port to permit introduction of water from the supply into said container means;

filtration means for filtering impurities from the water;

support means for supporting said filtration means within said container means so that said filtration means separates said container means into an upper intake chamber and a lower discharge chamber, said support means including a discharge port establishing fluid communication between said lower discharge chamber to said discharge port to thereby transfer filtered water from said discharge chamber;

spacer means for establishing a defined space between said support means and said bottom wall;

said support means also including an integral hinge means for permitting flexible displacement of said support means in response to distension of said filtration means during the filtration of water.

20. A filter device as in claim 19 wherein said support means includes a flexible base plate defining said discharge port and a pair of upright spaced-apart side plates, said filtration means being connected to the periphery of said base plate and side plates to thereby establish a substantially closed discharge chamber communicating with said discharge port, each of said side plates being connected to said base plate by means of said integral hinge means.

* * * * *